United States Patent
Hays et al.

(10) Patent No.: US 7,559,023 B2
(45) Date of Patent: Jul. 7, 2009

(54) SYSTEMS AND METHODS FOR DECLARATIVELY CONTROLLING THE VISUAL STATE OF ITEMS IN A REPORT

(75) Inventors: Christopher Alan Hays, Monroe, WA (US); Jason D. Carlson, Redmond, WA (US); Fang Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 10/927,894

(22) Filed: Aug. 27, 2004

(65) Prior Publication Data

US 2006/0085744 A1 Apr. 20, 2006

(51) Int. Cl.
*G06F 17/00* (2006.01)

(52) U.S. Cl. .................. 715/255; 715/227; 715/212

(58) Field of Classification Search .......... 715/200, 715/255, 213, 227–228, 212
See application file for complete search history.

(56) References Cited

U.S. PATENT DOCUMENTS

| | | | |
|---|---|---|---|
| 5,255,356 A | 10/1993 | Michelman et al. | |
| 5,317,686 A | 5/1994 | Salas et al. | |
| 5,418,950 A | 5/1995 | Li et al. | |
| 5,504,885 A | 4/1996 | Alashqur | |
| 5,603,025 A | 2/1997 | Tabb et al. | |
| 5,809,266 A | 9/1998 | Touma et al. | |
| 5,832,532 A | 11/1998 | Kennedy et al. | |
| 6,065,012 A | 5/2000 | Balsara et al. ............ 707/102 | |
| 6,195,653 B1 | 2/2001 | Bleizeffer et al. | |
| 6,271,845 B1 | 8/2001 | Richardson ............... 345/356 |
| 6,298,342 B1 | 10/2001 | Graefe et al. ............. 707/4 |
| 6,463,442 B1 | 10/2002 | Bent et al. | |
| 6,496,836 B1 | 12/2002 | Ronchi et al. | |
| 6,549,907 B1 | 4/2003 | Fayyad et al. ............ 707/101 |
| 6,633,882 B1 | 10/2003 | Fayyad et al. ............ 707/101 |
| 6,687,873 B1 * | 2/2004 | Ballantyne et al. ....... 715/215 |
| 6,920,608 B1 | 7/2005 | Davis | |
| 6,985,895 B2 | 1/2006 | Witkowski et al. | |
| 7,082,569 B2 | 7/2006 | Voshell | |
| 7,302,444 B1 * | 11/2007 | Dunmore et al. ......... 707/102 |
| 2001/0044811 A1 * | 11/2001 | Ballantyne et al. ....... 707/513 |
| 2001/0047372 A1 | 11/2001 | Gorelik et al. | |

(Continued)

OTHER PUBLICATIONS

Papakonstantinou et al. QURSED: Querying and Reporting Semistructured Data, ACM 2002, pp. 192-203.*

(Continued)

*Primary Examiner*—Cong-Lac Huynh
(74) *Attorney, Agent, or Firm*—Woodcock Washburn LLP

(57) ABSTRACT

Systems and methods for declaratively controlling the visual state of items in a report allow the visual state of any report item to be toggled from any other item. A set of declarative metadata may be associated with a report item. The declarative metadata may identify an initial visual state of the item, whether the item is a control item, and if so which other items are controlled from the item. The declarative metadata may further identify an initial visual state of a control image associated with a control item. Report processing software can initially display a report in accordance with the initial visual state specified in the declarative metadata. When a control item is activated, the software can change the visual state of identified items, as well as the visual state of the corresponding control image.

27 Claims, 11 Drawing Sheets

U.S. PATENT DOCUMENTS

| | | | |
|---|---|---|---|
| 2001/0049699 A1* | 12/2001 | Pratley et al. | 707/503 |
| 2002/0073105 A1* | 6/2002 | Noguchi et al. | 707/200 |
| 2002/0091681 A1 | 7/2002 | Cras et al. | |
| 2002/0154161 A1 | 10/2002 | Friedman et al. | |
| 2003/0115194 A1 | 6/2003 | Pitts et al. | |
| 2003/0149646 A1 | 8/2003 | Chen et al. | |
| 2003/0154277 A1* | 8/2003 | Haddad et al. | 709/224 |
| 2003/0208460 A1* | 11/2003 | Srikant et al. | 707/1 |
| 2004/0003138 A1 | 1/2004 | Finocchio | |
| 2004/0066410 A1 | 4/2004 | Lindhorst et al. | |
| 2004/0088158 A1 | 5/2004 | Sheu et al. | |
| 2004/0088650 A1* | 5/2004 | Killen et al. | 715/503 |
| 2004/0111666 A1* | 6/2004 | Hollcraft | 715/503 |
| 2004/0117731 A1 | 6/2004 | Blyashov | |
| 2004/0193435 A1* | 9/2004 | Fang | 705/1 |
| 2004/0205010 A1* | 10/2004 | Hamer et al. | 705/35 |
| 2004/0268371 A1* | 12/2004 | Carrell et al. | 719/330 |
| 2005/0010597 A1* | 1/2005 | Potter et al. | 707/104.1 |
| 2005/0039033 A1 | 2/2005 | Meyers et al. | |
| 2005/0166139 A1* | 7/2005 | Pittman et al. | 715/511 |
| 2005/0246341 A1* | 11/2005 | Vuattoux et al. | 707/9 |
| 2006/0048045 A1* | 3/2006 | Lehenbauer et al. | 715/509 |
| 2006/0294098 A1* | 12/2006 | Thomson et al. | 707/6 |
| 2007/0050697 A1* | 3/2007 | Lewis-Bowen et al. | 715/503 |
| 2007/0081197 A1* | 4/2007 | Omoigui | 358/703 |
| 2008/0046861 A1* | 2/2008 | Grieser | 717/104 |
| 2008/0104091 A1* | 5/2008 | Chin | 707/100 |

OTHER PUBLICATIONS

Lisper et al., Haxcel: A Spreadsheet Interface to Haskell, Google 2002, 14th International Workshop on the implementation of functional language, pp. 1-17.*

Hanna, Interactive Visual Functional Programming, ACM 2002, pp. 1-12.*

Feibus, A., "Crystal Reports Upgrade is Useful, Not Dramatic," *Information Week*, 1999, 721, 130-131.

Gray, J. et al., "Data Cube: A Relational Aggregation Operator Generalizing Group-By, Cross-Tab, and Sub-Totals," *Proceedings of the Twelfth International Conference on Data Engineering*, New Orleans, Louisiana, Feb. 26-Mar. 1, 1996, 152-159.

Jern, M., "3D Data Visualization on the Web," *Proceedings 1998 MultiMedia Modeling*, Lausanne, Switzerland, Oct. 12-15, 1998, 90-99.

Seymour, G., "Sum You Win, Sum You Lose (Accountancy Software)," *Personal Computer Magazine*, 1995, 134-136, 139-140, 142-143, and 145-146.

"Successful Portals Marry Structured, Unstructured Data," *I/S Analyzer Case Studies*, 2002, 41(10), 1, 5-7.

U.S. Appl. No. 10/400,375, filed Mar. 27, 2003, Hays et al.

U.S. Appl. No. 10/400,734, filed Mar. 27, 2003, Hays et al.

Johnson, Y. et al., "Special Edition, Using Borland Paradox 7 for Window 95 and Windows NT", Que Corporation, 1996, Library of Congress. Cat No.: 95-71446; ISBN: 1-7897-0205-3; Pages: title, 213-30,303-316, 382-385, 413-417, 522-525, 557-564, 587-588.

USPTO Interim Guidelines for Examination of Patent Applications for Patent Subject Matter Eligibility, 59 pages.

Stolte, C. et al., "Polaris: A System for Query, Analysis, and visualization fo Multidimensional Relational Databases", IEEE Trans, Visualization Comp. Graphics, 2002, 8(1), 52-65.

Sunita, S., "Explaining Differences inMultidimensional Aggregates", Proceedings of the Twenty-Fifth International conference on Very Large Data Bases, Orlando, Florida, Sep. 7-10, 1999, 42-53.

Nimal, N., "Normal Form of Extended Table Matrix L Systems", Information Sciences, 1986, 39, 153-173.

Stinson, et al., "Creating a Pivot Table; Pivoting a Pivot Table", Microsoft Office Excel, 2003, 800-806, XP 002461558, Figures 30-2, 30-7.

* cited by examiner

|  | Control Image 130 | Item 121 | Item 122 |
|---|---|---|---|
| Control Item 120 | ⊞ Customer | Year | Sales $ 32,412 |
|  | Grand Total |  |  |

Item 124     Item 123

*(Prior Art)*
*Fig. 1a*

| | Control Image 132 | | |
|---|---|---|---|
| Control Item 107 | ⊟ Customer | Year (152) | Sales (153) |
| List of Sub-Items 108 | ⊞ Acme (101a) | | |
| | ⊞ Bob's Discount (101b) | | |
| | Grand Total (101c) | | $ 32,412 (153g) |

*(Prior Art)*
*Fig. 1b*

|  | Control Image 131 | Control Item 105 | | |
|---|---|---|---|---|
| | | ⊟Customer | Year (102) | Sales (103) |
| Control Item 165 | | ⊟ Acme (101d) | | |
| List of Sub-Items 106 | | | 2001 (102a) | $ 13,312 (103a) |
| | | | 2002 (102b) | $ 11,156 (103b) |
| | | | Total (102c) | $ 24,468 (103c) |
| Control Item 166 | ⊟ | Bob's Discount (101e) | | |
| List of Sub-Items 109 | | | 2001 (102d) | $ 6,421 (103d) |
| | | | 2002 (102e) | $ 1,523 (103e) |
| | | | Total (102f) | $ 7,944 (103f) |
| | | Grand Total (101f) | | $ 32,412 (103h) |

*(Prior Art)*
*Fig. 1c*

| Salesman (201) | 1990 Sales (202) | Total Sales (205) |
|---|---|---|

*(Prior Art)*
*Fig. 2*

| Salesman (301) | 1990 Sales (302) | Total Sales (305) |
|---|---|---|
| Bob (301a) | $9762 (302a) | $17,251 (305a) |
| Martha (301b) | $867 (302b) | $11,629 (305b) |
| Hank (301c) | $656 (302c) | $16,101 (305c) |

*(Prior Art)*
*Fig. 3*

*Declarative Metadata 504a(i)*

*Initial Visibility 600*: Off, On, Calculate from report data

*Control item 601*: No, Yes, Identification of toggled items

*Initial Control Image State 602*: (Select from all available states)

| | Customer | Year (826a) | ⊞ Sales (828a) |
|---|---|---|---|
| | ⊟ Acme | | |
| | | 2001 (826b) | $ 13,312 (828b) |
| | | 2002 (826c) | $ 11,156 (828c) |
| | | Total (826d) | $ 24,468 (828d) |
| | ⊟ Bob's Discount | | |
| | | 2001 (826e) | $ 6,421 (828e) |
| | | 2002 (826f) | $ 1,523 (828f) |
| | | Total (826g) | $ 7,944 (828g) |
| | Grand Total (827) | | $ 32,412 (828h) |

Control Image 821
Control item 829
Control Item 822
Toggled Items 823
Control Item 824
Toggled Items 825

*Fig. 8c*

|  | Control Image 830 | Control Item 831 | Control Image 840 Toggled Item 832 |
|---|---|---|---|
| ⊟ *Customer* | *Year* | ⊟ *Sales* | ⊟ *Top Product* |
| ⊟ Acme | | | |
| | 2001 | $ 13,312 | Widget 832a |
| | 2002 | $ 11,156 | Accessory 832b |
| | Total | $ 24,468 | |
| ⊟ Bob's Discount | | | |
| | 2001 | $ 6,421 | Beanie 832d |
| | 2002 | $ 1,523 | Widget 832e |
| | Total | $ 7,944 | |
| Grand Total | | $ 32,412 | |

Item 833

*Fig. 8d*

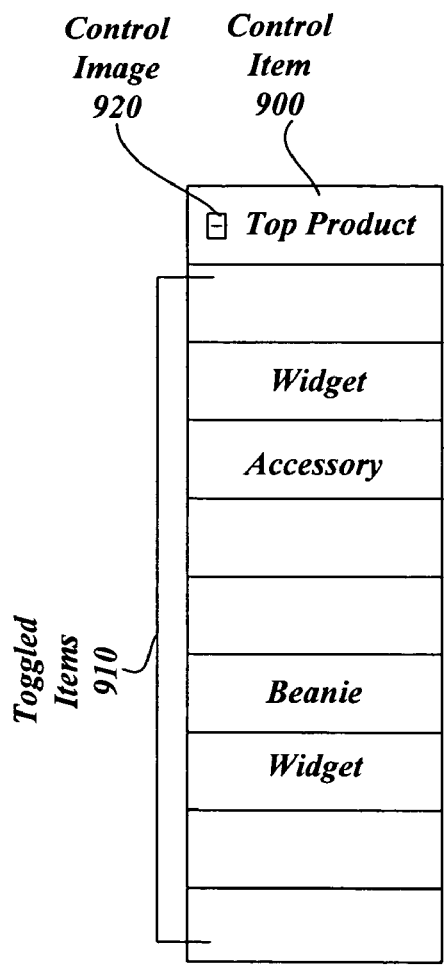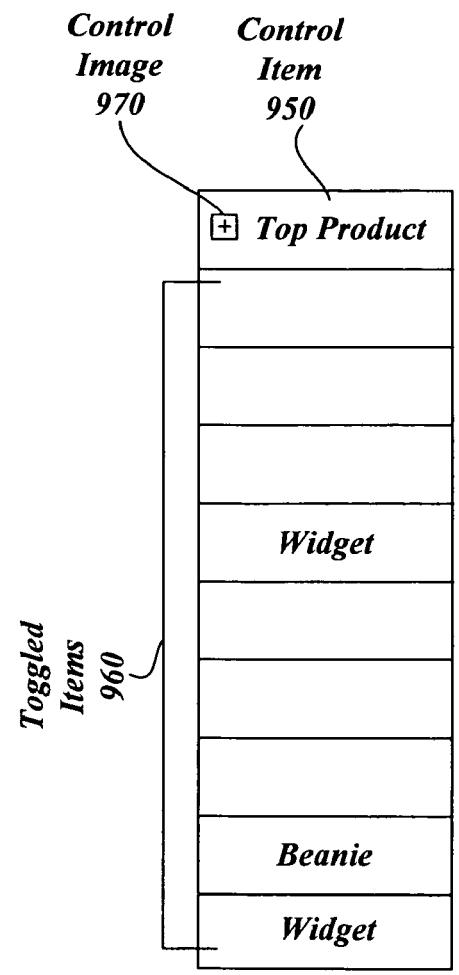
*Fig. 9a*  *Fig. 9b*

SYSTEMS AND METHODS FOR DECLARATIVELY CONTROLLING THE VISUAL STATE OF ITEMS IN A REPORT

CROSS-REFERENCE TO RELATED APPLICATIONS

The subject matter described in this application is related to the subject matter described in co-pending U.S. application Ser. No. 10/400,734, filed on Mar. 27, 2003, entitled "Defining a Report Based on Data Regions and Including Custom Data in a Report Definition," and to co-pending U.S. application Ser. No. 10/875,832, filed on Jun. 23, 2004, entitled "Systems and Methods for Flexible Report definitions Including Table, Matrix, and Hybrid Designs," and as well as U.S. application Ser. No. 10/903,306 filed on Jul. 30, 2004, entitled "Systems and Methods for Controlling Report Properties Based on Aggregate Scope".

FIELD OF THE INVENTION

This invention relates to generating reports that display data, such as company financial data, using computers; and more particularly to flexible control over which items in a report are displayed.

BACKGROUND OF THE INVENTION

In any enterprise, data regarding aspects thereof is accumulated over time. This data can be used to report the status of the enterprise. For example, with regard to a sales enterprise, sales data can be accumulated pertaining to each sale of a product, including the salesman, the customer, the region of the salesman, the region of the customer, the amount of the sale, the quantity of the product sold, the date of the sale, the date of the delivery of the sold product, and so on. Based on such sales data, then, it may be that a report is generated that details sales by year, by month, by customer by year, by product by quarter, by salesman by delivery date, by region by week, etc.

The data that populates a report will typically be accumulated in a data source, such as a database. A data source, as the term is used here, is a storehouse for digitally recorded data. In order to filter the data in a data source into properly organized columns and rows for a report, a report designer may specify, in a report design, the particular data that is desired from a data source. For example, a report designer might specify that he wants a "salesman name" in the first column of a report.

The report designer may then write a program that recognizes a field indicated for the first column of a report design (salesman name), queries a data source for all salesman names, and places them one after the other in the first column of a report. Instead of writing his own program to carry out this task, the report designer may use commercial software that provides this function. Such software may allow a report designer to simply specify, in a report design, a type of data he wants in the first report column. The commercial software will then automatically analyze the report design, query a database, and place the desired data in the first column of a report. This operation is also available in commercial products for any number of columns and/or rows of a report.

FIG. 1a, FIG. 1b, and FIG. 1c give an example of various views of a generated report. As shown in these figures, some of the items in a report may be initially hidden from view. These hidden items may be made visible by a consumer of the report, typically by selecting an area in a report item such as control image 130. FIG. 1a, FIG. 1b, and FIG. 1c will be discussed in greater detail below, after a more thorough discussion of report processing software in connection with FIG. 2, FIG. 3, and FIG. 4.

An exemplary report design is illustrated in FIG. 2. The exemplary report design provides a salesman column 201, a 1990 sales column 202, and a total sales column 205. This report design may be submitted to supporting software that can pull the corresponding data from a data source to populate the actual report. An example of such an actual report is provided in FIG. 3. FIG. 3 shows a populated salesman column 301, a populated 1990 sales data column 302, and a populated total sales column 205.

Exemplary report processing software for populating a report design with appropriate data is depicted in FIG. 4. The report processing software 410 may comprise a plurality of data extensions for properly interpreting the data stored in any of a plurality of data sources 420 and 421. The report processing software may also comprise a number of rendering extensions 412 to properly output reports in an appropriate file format, e.g. Hyper-Text Markup Language (HTML) 430, Extensible Markup Language (XML) 431, or some other file format 432. A report design 400, also referred to herein as a report definition, is used by the report processing software to identify the data to be gathered from data sources 420, 421 and compile the data into a properly structured report, outputting the report in any file format 430, 431, 432. This process is described in greater detail in U.S. patent application Ser. No. 10/400,734, which is hereby incorporated by reference in its entirety.

Reporting is moving away from traditional presentation on paper to presentation on the display surface of Graphic User Interfaces (GUIs). This may be driven by an increase in the amount of data available for reports, which makes static paper presentation of reports less appealing. It may also be driven by improvement in the quality and availability of computing technology for displaying reports. In connection with this shift in report display, reporting is increasingly making use of dynamic, rather than static views. Dynamic views allow a user to interact with a report to control the data that is displayed, while static views do not allow users to control the display properties of a report. The traditional means for controlling the visual state of report items is illustrated in FIG. 1a, FIG. 1b, and FIG. 1c. FIG. 1a shows a view of a report in a collapsed view, FIG. 1b shows a view of the same report in an expanded view, and FIG. 1c shows the same report in a further expanded view.

The features FIG. 1a, FIG. 1b, and FIG. 1c are familiar to those of skill in the art as well as to many consumers who have used reports incorporating such visual state control technology. In general, a report may be presented in an initial visual state as shown in FIG. 1a. In this initial visual state, a number of items 120-124 are visible, i.e. their visual state is "on." For example, control item 120 is visible in FIG. 1a.

In exemplary FIG. 1a, control item 120 is a column heading identified as "customer." A user of such a report would imply that when additional items are displayed directly underneath control item 120, those additional items will contain customer data. There are various other visible items 121-124 in FIG. 1a, which provide additional information about the data contained in the report. Note that these additional items 121-124 are not "control" items, in that the display of additional data cannot be controlled from items 121-124. Instead, items 121 and 122 suggest that a year data column and a sales data column, respectively, will be presented alongside the customer data column when the report is expanded. Items 123 and 124 provide grand total data, which may be convenient for a quick review and summary of the contents of the report.

The status of control item 120 as an item from which the visual state of additional items can be controlled is traditionally represented by the small control image 130 within the control item 120. Such an image 130 may also be placed alongside a control item 120. This control image 130 indicates to users that performing an action on the control item 120, such as clicking on the control item 120 or clicking on the control image 130, will change the visual state of items directly beneath the control item 120. The image 130 is traditionally either a plus (+) or a minus (−) sign. The plus sign 130 indicates that the items directly beneath a control item 120 are not visible, while the minus sign 132 from FIG. 1b indicates that items directly beneath a control item 107 are visible. In this manner, the control image 130, 132, suggests an action to a report user: the plus suggests adding items to a report display, while the minus suggests subtracting items from a report display.

FIG. 1b illustrates the exemplary report in FIG. 1a after the control item 120 has been used to toggle the visual state of the items directly beneath the control item 120. As shown, a list of subitems 108 is now visible in the report. This list 108 is directly beneath the control item 107. The list 108 traditionally first appears in a collapsed view as in FIG. 1b, instead of fully expanded as in FIG. 1c. In the example provided by FIG. 1a, FIG. 1b, and FIG. 1c, each of the customer headings 101a and 101b are themselves control items which can be further used to control the visual state of lists of subitems 106 and 109 as shown in FIG. 1c.

FIG. 1c presents a fully expanded view of the exemplary report. Each of the control images, e.g. 131, is displayed as minus symbol, indicating that the control items 105, 165, 166 can be used to remove items from the report display by toggling their visual state to "off." The control items 105, 165, 166 in FIG. 1c cannot, however, be used for any further control of the visual state of the items. Moreover, the set of items controlled by the control items 105, 165, 166 is limited to the list of subitems, e.g. 109, 106 directly beneath each control item 105, 165, 166.

FIG. 1a, FIG. 1b, and FIG. 1c demonstrate the current state of the art in commercial report design software for flexibly controlling the visual state of items in a report. One drawback of such systems is the inability to allow further control of the visual state of items beyond toggling all items between a visual state of "on" and a visual state of "off." Another drawback is the inability to control the visual state of any items beyond those directly below a control item.

Further, if such drawbacks are to be resolved, the current report design technology does not offer an easily understandable technique for defining the relationships between control items and the items whose visual state is toggled from the control items—the toggled items. Those who use report design software to design reports are not necessarily advanced computer programmers. If the flexibility of report design software is to be increased, it should be accompanied by easily understandable techniques for harnessing increased design power.

In light of the drawbacks in the commercial software industry for supporting report design, there is a need to provide easily understandable techniques for designing reports that result in more freedom to control the visual state of report items, and to provide software mechanisms to support such techniques for designing reports.

SUMMARY OF THE INVENTION

Systems and methods for declaratively controlling the visual state of items in a report allow the visual state of any report item to be changed, or toggled, from any other item. A set of declarative metadata may be provided for various items in a report or region of a report. The declarative metadata may identify an initial visual state of an item that determines whether the item is visible prior to any user interaction with the report. The declarative metadata may also identify an item as a control item. It may further identify the toggled items that are controlled from a control item. It may also identify an initial visual state of a control image associated with a control item.

Report processing software can initially display a report in accordance with the initial visual state specified in the declarative metadata. When a control item is activated, the software can toggle the visual state of identified toggled items, as well as the visual state of the corresponding control image.

The report software can also calculate the toggle relationships in the report when the report is first displayed, and store this information in memory for later reference. An initial report snapshot can be generated which represents the initial visual state of report items. When items are subsequently toggled by activating a control item, information about the items whose visual state is toggled can be stored. This allows generation of further report snapshots, as the visual state of various items are toggled, by reference to the session memory and without the need to recalculate toggle relationships or trace the history of items that may have been previously toggled.

BRIEF DESCRIPTION OF THE DRAWINGS

FIG. 1a illustrates a prior art report display that allows some control over the visual state of items in the report. A control item may be activated to toggle the visual state of items directly beneath the control item.

FIG. 1b illustrates the report of FIG. 1a, where the control item associated with the customers column header has been activated to display a list of subitems directly beneath the control item.

FIG. 1c illustrates the report of FIG. 1a and FIG. 1b in which the control items exposed in FIG. 1b have been further activated to expose further subitems that are directly beneath the respective control items. All subitems are either visible or not visible at the same time.

FIG. 2 illustrates a prior art report design that can be used by report design software, such as that of FIG. 4, to generate a report, such as that of FIG. 3, by populating the various identified columns and/or rows from the report design with data from a data source.

FIG. 3 illustrates a generated report that could be made by combining the report design of FIG. 2 with data from a data source. This process is carried out by report design software as illustrated in FIG. 4.

FIG. 8c illustrates a third view of an exemplary report that implements the report design techniques providing increased flexibility and control.

FIG. 8d illustrates a fourth view of an exemplary report that implements the report design techniques providing increased flexibility and control.

FIG. 9a illustrates a column of a report from FIG. 8d, where some toggled items can be toggled off while other are on, and vice versa as provided in FIG. 9b.

FIG. 9b illustrates column of a report from FIG. 8d, where some toggled items can be toggled off while other are on, and vice versa as provided in FIG. 9a.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 5:
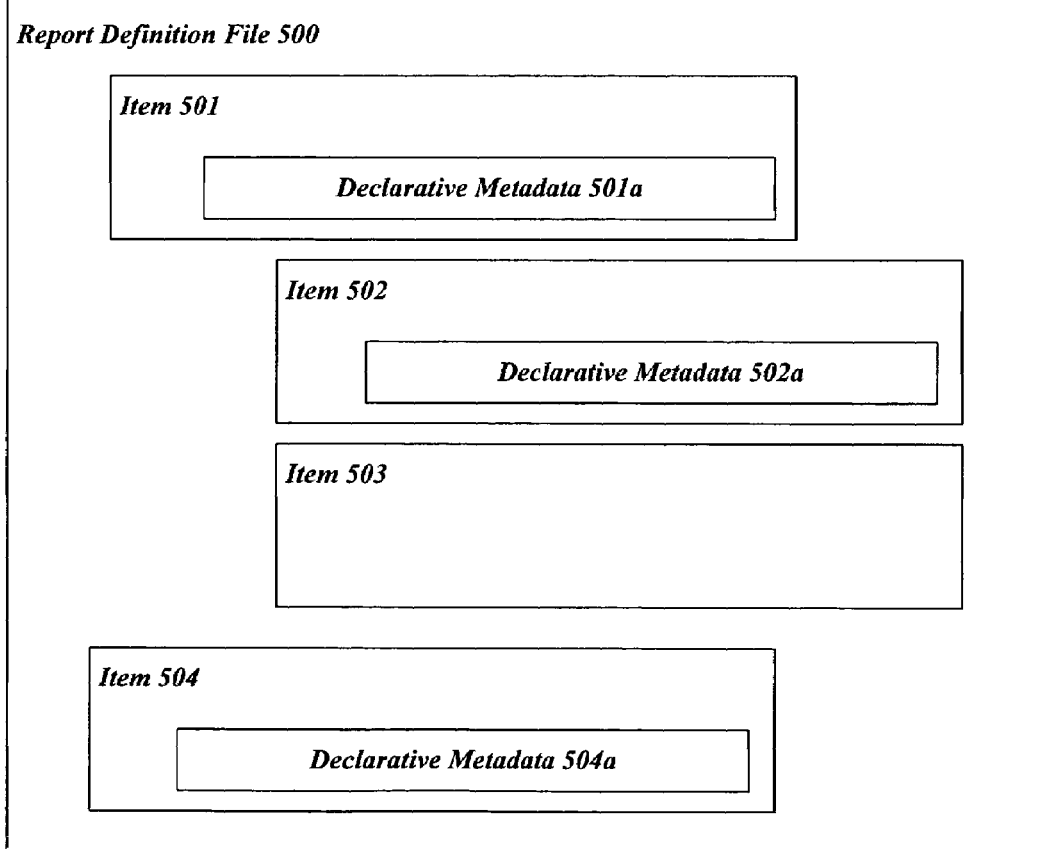
FIG. 5 provides a schematic view of a report definition file, with blocks of data that represent the properties of report items. Visual state control parameters can be associated with the data describing other features of an item, and are used by report processing software to generate views of a report.
Figures 6, 7:
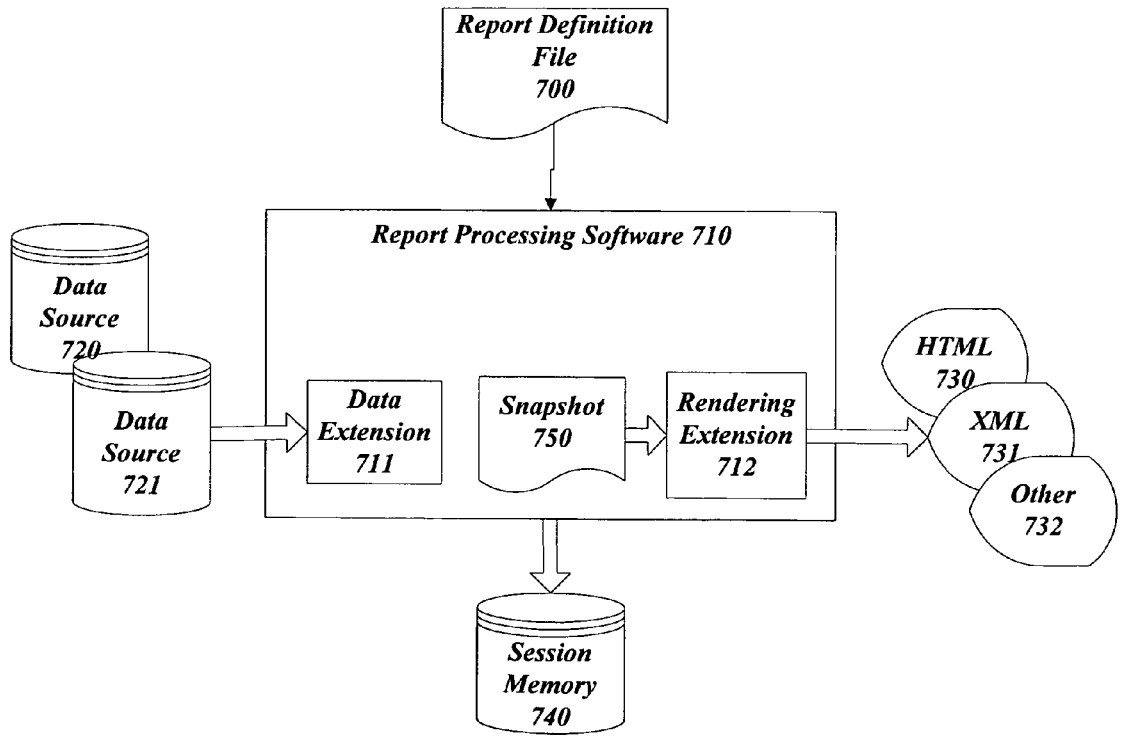
FIG. 6 illustrates a set of visual state control parameters that may be associated with any item of a report to provide for flexible control over the visual state of items and control images.
FIG. 7 illustrates report processing software for use in connection report definition files such as that provided by FIG. 6. The software can generate report snapshots based on the visual state of items, and can store the visual state of items in a session memory.
Figure 12:
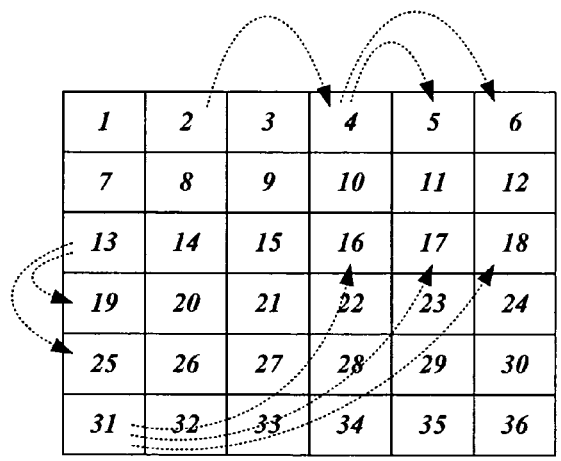
FIG. 12 demonstrates calculating toggle relationships between report items. The various control items and the associated toggled items are identified.
Figure 13:
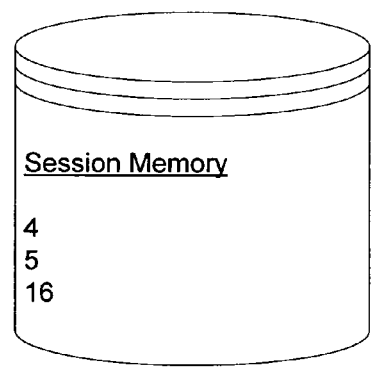
FIG. 13 provides a session memory that tracks whether particular items have been toggled from their initial visual state. By comparing this information to an initial visual state parameter, the visual state of an item in a most recent report snapshot can be quickly determined.
Figure 14:
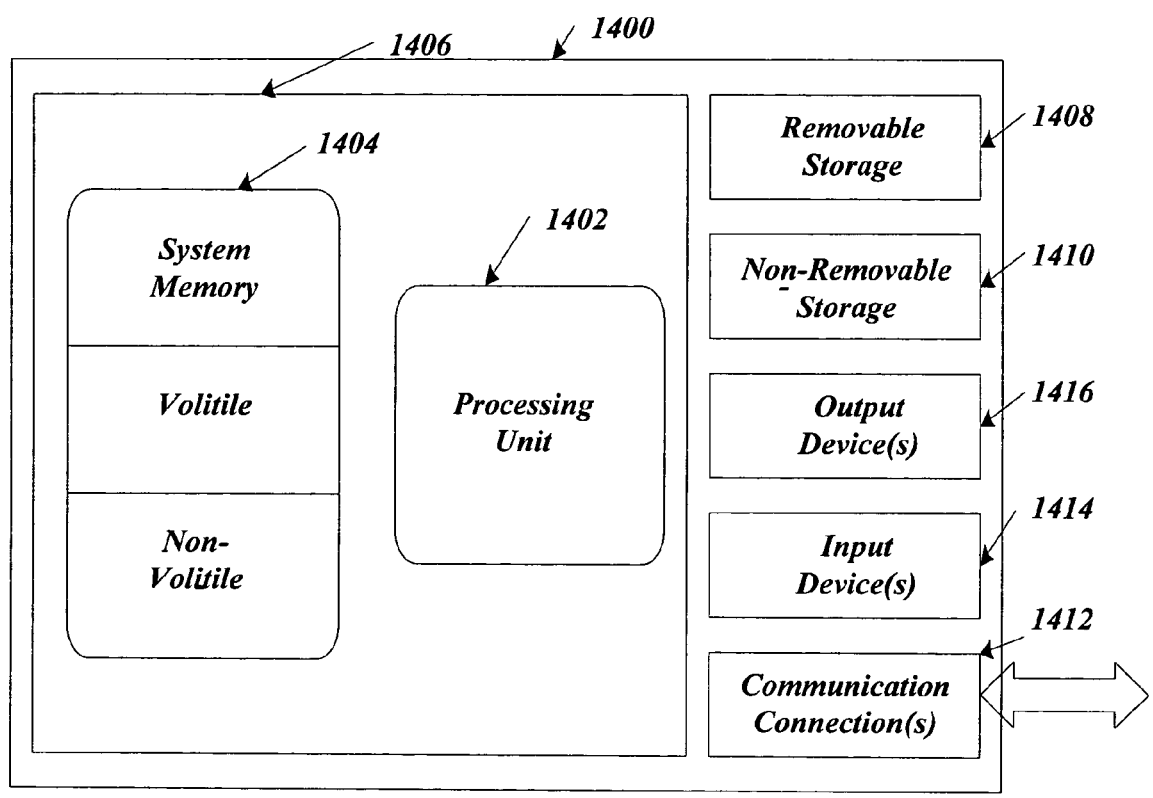
FIG. 14 illustrates the basic components of a prior art computing device suitable for use with the invention.

The various aspects and embodiments of the invention can be understood with reference to FIG. 5, FIG. 6, FIG. 7, FIG. 8a-FIG. 8d, FIG. 9a-FIG. 9b, FIG. 10, FIG. 11, FIG. 12, and FIG. 13. FIG. 5 is a graphic illustration of a report definition file 500 with declarative visual state ontrol metadata, or markings for controlling the visual state of report items. The declarative metadata 504a from FIG. 5 is depicted in greater detail in FIG. 6, and is identified in FIG. 6 as element 504a(i). Exemplary report processing software for processing reports that make use of such declarative metadata is illustrated in FIG. 7. FIG. 8a, FIG. 8b, FIG. 8c, and FIG. 8d present a series of views of an exemplary report that might be generated using the declarative metadata and report processing software of FIGS. 5-6 and FIG. 7, respectively. FIG. 9a and FIG. 9b present further potential features of the exemplary report depicted in FIG. 8a-FIG. 8d. FIG. 10, FIG. 11, FIG. 12 and FIG. 13 illustrate various useful processes that may be implemented via the report processing software of FIG. 7. Finally, FIG. 14 provides a general description of a prior art computing device of the type that is generally contemplated for use in connection with carrying out the systems and methods herein.

The invention is generally contemplated for use in reports, although it could be extended and adapted to use in many settings. A report is generally considered to be a compilation of data for display in columns and rows on a visual surface. However, reports may also include other data representations such as charts, e.g. the familiar pie chart, and graphs, e.g. the familiar bar graph. It will be acknowledged that the invention can be adapted to these settings, although it will be generally described here with reference to the columns and rows of a matrix and/or table.

The data in a report can be any data. A typical report may include financial data for an enterprise, such as gross revenue for the sales of various products, expenses associated with various products, profits associated with various products, and the like. Other reports may include customer information, such as names, contact information including telephone numbers, addresses, and email addresses, as well as product preferences, gross annual purchases, special discounts, and so on. A report may also be used to track employees, by compiling employee names, hours worked, accomplishments, scheduled vacation time, special needs, etc. These examples are a very small subset of the possible data that may be included in a report. Any data that humans may desire to compile regarding any endeavor can be placed in a report. Examples of actual reports are provided in the Figures at FIG. 1a, FIG. 1b, FIG. 1c, and FIG. 3. The reports in the figures display somewhat less data than the typical report, for ease of illustration. Other reports may include tens, hundreds, or thousands of rows and columns, as necessary to display all the data for a report.

A column of a report is a vertical band in which related report data is located. A column may be identified by a column heading in a top row of a column. A column may be divided into subgroups of columns, which may themselves be further be divided into subgroups down to any level of subgrouping. Similarly, a row of a report is a horizontal band in which related report data is located. A row may be identified by a row heading in a first column of a row. A row may be divided into subgroups of rows, which may themselves be further be divided into subgroups down to any level of subgrouping.

A report design is a template for a report that shows what data will be displayed in an actual report and the layout of the data. A simple report design may indicate a plurality of columns for a table, such as in FIG. 2. A report design can be used by report processing software to generate an actual report by populating the appropriate columns and rows indicated in a report design with appropriate data.

Figure 4:
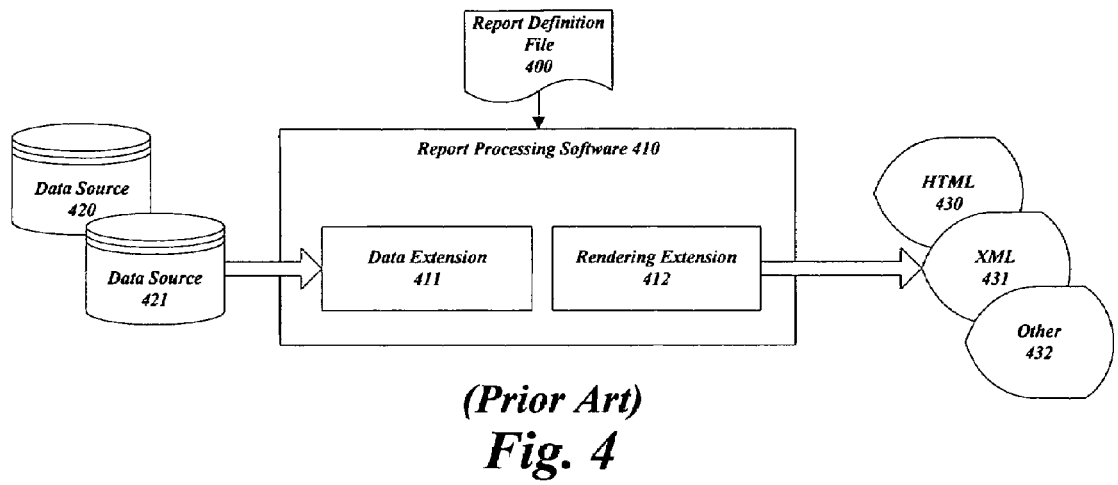
FIG. 4 illustrates report design software for combining a report design such as that of FIG. 2 with data from data sources to produce reports such as that of FIG. 3. The data extension can be used to properly interpret the data from the data sources, while the rendering extensions can be used to place a generated report into an appropriate file format for display, such as Extensible Markup Language (XML) format or Hyper Text Markup Language (HTML) format.

A report design may be generated using commercial report design software. Distinguish report design software from report processing software. The former is for designing reports resulting in a report definition file. The latter, as illustrated in FIG. 4, is for generating reports by fetching the appropriate data and organizing it according to the report definition. Both report design and report generation software may be included in a single report software product.

Report design software typically uses a GUI for graphically representing a report design. For example, report design software may present a designer with a number of empty columns and rows on a computer screen GUI. A designer may select any of the various columns and rows using a mouse or other control device. A designer may then enter data that is desired for a report by selecting from a plurality of menu options, or by identifying the data directly through typing identification information with a keyboard input. The information that a report designer enters using various input devices may then be stored in a report definition file. This file provides a compact representation of the report definition created by a report designer, and may be in any number of file formats, e.g. XML, HTML, .txt, .doc, etc.

Alternatively, report definition files may be coded directly, without the graphical aids provided by report design software. In this situation, a report designer familiar with the requisite syntax for a report definition file can simply enter such syntax using a keyboard. This approach may provide a designer with greater flexibility in designing a report, because he is no longer dependent upon the functions of report design software for his report features. However, it may also be less convenient and more susceptible to human error.

Declarative control over the visual state of items in a report may be implemented both through the GUI provided by report design software, or in the situation where a report definition file is coded directly. In the report design software scenario, a declaration may be made in the graphically represented report items, which is subsequently translated into declarative metadata in a report definition file. In the direct coding scenario, a declaration may be made directly by writing out computer readable instructions in an appropriate syntax.

A declaration can be any marking. Such a marking might be brackets, text font, text color, text point size, the presence of a particular symbol such as a star *, a letter (a, b, c, etc.), or the use of an identifying word, e.g. "initial visual state=on." The invention is not limited to the particular marking used to declaratively control the visual state of report items. Instead, the invention comprises the use of any declaration to flexibly control the visual state of report items.

In a preferred embodiment, the visual state of items in a report is controlled using a set of declarations in Extensible Markup Language (XML). Declarative elements or attributes can be defined in an XML schema or in an XML Document Type Definition (DTD) which will be recognized by report processing software. For example, an "initial visibility" element can be defined as an element that determines the initial visibility of a report item. If a report item has an element that declares, for example, "initial visibility=on," then report processing software can display the item in an initial presentation of a report. Further declarative control over the visual state of report items will be explained in connection with the visibility attributes discussed below. Those familiar with XML will appreciate that all declarations can be made as either elements or attributes.

Referring to FIG. 5, a plurality of items 501-504 are presented. Each item 501-504 may contain any type and amount of data pertaining to the item. For example, consider item 501. This could be a column header item. The location of the item 501 in a report may be declared in the report definition file 500, along with a desired font size for the item 501, an image that is displayed in the item 501, or other such data for display of the item 501. Item 501 could also be designated for dynamic presentation. In other words, a category of data may be identified by an item 501 in a report definition file 500, resulting in a plurality of items being displayed when the definition file 500 is combined with data to generate a report. This process can be understood with reference to FIG. 2, FIG. 3, and FIG. 4 and corresponding description.

Declarative metadata 501a-504a may be included along with the other available data associated with the items 501-504 of a report definition file 500. Such declarative metadata 501a-504a can indicate a number of features for controlling the visual state of items in the report. Some such features are illustrated in FIG. 6, which gives exemplary declarative metadata 504a(i) which could correspond to the declarative metadata 504a from item 504 in FIG. 5.

Referring to FIG. 6, the declarative metadata 504a(i) can declare an initial visibility 600 for the item 504. This declaration 600 can be used to determine whether the item is initially visible prior to user interaction with the report. As illustrated in FIG. 6, this parameter 600 may indicate that an initial visibility is "on," which presumably though not necessarily declares that the item will be part of an initial report display. The parameter 600 may also indicate that an initial visibility is "off," which presumably though not necessarily declares that the item will not be part of an initial report display. Note that, because any marking or the absence thereof may be considered a declaration, the absence of parameter 600 from declarative metadata 504a(i) could also be interpreted to impact the initial visibility of the item. For example, all items without a parameter 600 could be construed to be initially visible in a report.

Figures 8A, 8B:
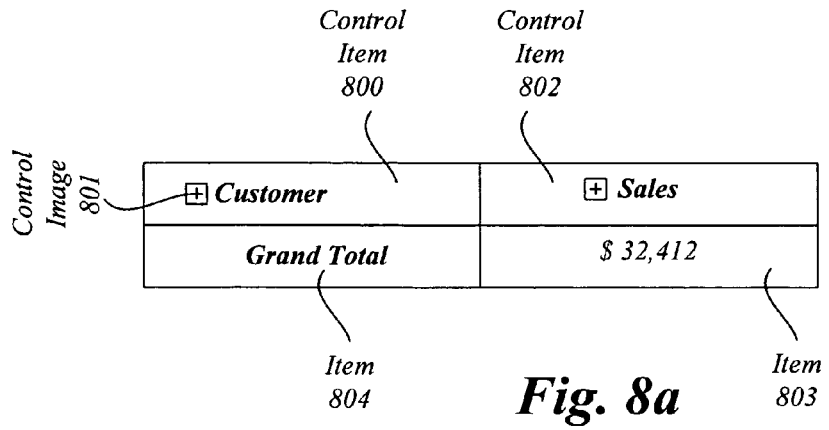
FIG. 8a illustrates a first view of an exemplary report that implements the report design techniques providing increased flexibility and control.
FIG. 8b illustrates a second view of an exemplary report that implements the report design techniques providing increased flexibility and control.

The initial visibility declaration 600 may also be calculated from report data, as suggested in FIG. 6. In this embodiment, a declaration 600 may refer to some other data in an item. The declaration can provide for, example, that if the other data is within a specified value range, then the declaration 600 is "on." If the other data is not within the specified value range, then the declaration 600 is "off." By way of further example, refer to FIG. 8b, and imagine for the moment that FIG. 8b is the initial display of a report. Note that all or the sales FIGS. 817a, 817b, and 817c are above $5000. This could be the result of a declaration 600 associated with the sales totals 817a, 817b, and 817c that provides to display a sales item only if its value is greater than $5000. There may be other sales totals in the report of FIG. 8b that are initially hidden because they are less than $5000. If the declaration 600 is calculated from report data in this way, it will be acknowledged that it could be calculated from any report data, not just numerical data. It could be calculated from any item data, such as a level of nesting, from a text font for an item, or from a level of importance associated with report items.

FIG. 6 also provides a declaration that an item is a control item 601. A control item is a report item from which the visual state of one or more other report items may be toggled. This declaration 601 can be "no" which presumably though not necessarily manifests that the item containing the declaration 601 is not a control item. Remember, a declaration 601 can be any marking. This declaration 601 can also be "yes" which presumably though not necessarily manifests that the item containing the declaration 601 is a control item. When an item is a control item, the declaration 601 may refer to the items that are toggled by the control item. For example, with reference to FIG. 8a and FIG. 8b, a control item 800 from FIG. 8a and 810 from FIG. 8b may refer to toggled items 812 and toggled item 813. When the control item 810 is activated, the toggled items 812, 813 are displayed. Note here than any toggled items can be referred to by a control item 810. The toggled items need not be directly beneath the control item 810, but can instead be anywhere in a report. For example, toggle item 813 is beside control item 810, not beneath it. Likewise, a toggled item can be above, below, or beside a control item. Indeed, control item may identify itself as a toggled item.

Note also that toggle items can be at any level of nesting. Presumably, though not necessarily, all items nested underneath a toggled item will also become visible when a toggled item's visual state is turned on. In this regard, the such nested items can either be referred to in the declaration 601, or report processing software can be designed to recognize an appropriate visual state for nested items in this situation. For example toggled item 813 is a column header representing year data. When this toggled item has been toggled on by the control item 810, all of the items in the column (or as much of the column as currently available) can also be toggled on.

Still further, a declaration 601 can specify toggled items for both a toggle up and toggle down state. This concept is represented in FIG. 9a and FIG. 9b. Some toggled items may be presented when a control item is activated, while others are presented when the control item is deactivated. This presents a clear advantage over prior systems, which only allowed all toggled items to be simultaneously visible or not visible. As illustrated in FIG. 9a and FIG. 9b, a list of toggled items 910 can be made available when control item 900 is activated. Those toggled items 910 can be made to disappear, while instead presenting toggled items 960, when control item 950 (referred to as 900 in FIG. 9a) is deactivated.

Extending the model presented in FIG. 9a and FIG. 9b, the declaration 601 could also be designed to engage in more complicated toggling. For example, any number of intermediate lists of toggled report items may be specified. A control item could be activated a number of times to display different sets of toggled items each time. While only two sets of toggled items are provided in FIG. 9a and FIG. 9b, any number of sets of toggled items could be declared in 601. For example, an initial set of zero visible toggled items may be displayed as the initial report display. A first activation of a control item could operate to display a first category of toggled items declared in 601. A second activation of the same control item could operate to display a second category of toggled items declared in 601. A third activation of the same control item could operate to display all toggled items, both those of the first activation, and those of the second activation. Finally, a fourth activation of the same control item could operate to again display zero toggled items. Such an embodiment could be accompanied by four potential control images to properly indicate the visual state of the toggled items, as explained in greater detail below.

Lastly with reference to FIG. 6, a declaration for an initial control image state 602 is provided. This declaration 602 indicates the control image that will be presented prior to user interaction with the associated control item. For example, a control item may be initially presented with a small plus (+) symbol as a control image. Refer to control image 801 in FIG. 8a. In this case, the appropriate declaration 602 could be, for example, "initial control image=plus," or "initial control image=collapsed." The declaration 602 could also be any other marking which is systematically used to indicate the initial state of a control image.

Similarly, the initial image state declaration 602 could indicate that a minus (−) image is to appear prior to any user interaction with a control item. If a report is designed to use control images in the typical way, setting a minus (−) image as the initial image state would indicate that toggled items are in an expanded view, i.e. their visual state is on. However, an advantage of this aspect of the invention is that the initial image state need not be used in the conventional way. A report designer can set an initial image state as he prefers. In this regard, an minus (−) image can be set as an initial image state using declaration 602, while the items toggled from the respective control item are set (using declaration 600) to an "off" initially visual state. This is the opposite of the traditional appearance of reports, in which a minus (−) indicates that subitems are visible. The ability to control the initial control image state 602 using declaration 602 provides somewhat more flexibility in report control and appearance than previous systems.

The flexibility allowed by providing declarative control over an initial image state extends beyond the typical use of plus (+) and minus (−) symbols to indicate visual states of "off" and "on," respectively. Recall from the discussion of declaration 601 that an advantage of the invention is that all toggled items need not be "off" or "on" simultaneously. Instead, a first set of items may be toggled off when a second set is toggled on. In this situation, the traditional use of the plus and minus symbols to indicate "all off" or "all on" is no longer appropriate. Declaration 602 allows a report designer to determine for himself which control image corresponds to the various available visual states of the toggled items. A plus (+) control image can be set as the initial control image state, while a first set of toggled items are set to be initially visible. Activation of the control image can then toggle the first set of toggled items off, while toggling a second set of toggled items on. This activation can also operate to change the control image state to a minus (−). Therefore, the plus (+) and minus (−) can correspond to display of different sets of toggled items.

Any images may be used as control images. For example, smiling faces and frowning faces could be used instead of plusses and minuses. The control image could correspond to the data that is displayed. For example, consider a report for a shipping company. When toggled items pertaining to nautical shipping data are displayed, a control image that appears to be a small sailboat may appear. When the nautical data is toggled off and land data toggled on, a control image may appear as a truck.

Furthermore, using the techniques disclosed herein, the potential visual states accessible from a single control item need not be limited to two. Any number of groupings of toggled items may be toggled through from a single control item. Control items can be provided that correspond to the various groupings, or sets of toggled items. Consider again the shipping company report from above. Instead of toggling between nautical and land shipping, a control item may initially appear as an empty box, indicating, for example, an initial visual state where all toggled items are off. Upon first activation, the control image can change to a sailboat, indicating nautical shipping data. A first set of toggled items corresponding to the nautical shipping business is displayed. Upon second activation, a second control image can appear, for example, a truck. A second set of toggled items corresponding to shipping by truck is displayed. Upon a third activation, a plane appears as the control image and corresponding data for air freight is displayed. Upon a fourth activation, a train appears and train shipping data it toggled on. Finally, on a fifth activation, all toggled items are returned to a visual state of off and the empty box appears as the control image.

A report definition file with declarative visual state parameters such as those in FIG. 6 will ultimately be used by report processing software to generate a report. Report processing software includes any software for compiling a report. Some general aspects of report processing software suitable for use with other aspects of the invention are displayed in FIG. 7. Such software 710 performs the function of querying a data source 720, 721 to retrieve data that is specified in a report design or report definition 700. One or more data extensions 711 may be used to properly interpret data from a data source 720, 721. The software 710 then compiles the retrieved data into a layout specified by the report definition 700. As a part of this compilation, the various visual state properties of a report may be determined, as described in greater detail below. The output report may be rendered into any file format, e.g. 730, 731, 732 using one or more rendering extensions 712. Those of skill in the art will acknowledge that separate software components, such as objects created in a language that supports object oriented programming, can be used to perform the various functions of report processing software 710.

In connection with compiling retrieved data into a layout specified by the report definition 700, various embodiments of the invention make use of features for report processing software 710 that differ from prior art software. In short, embodiments of the invention can calculate all toggle relationships in a report (illustrated in FIG. 12), generate one or more snapshots 750 of a report for delivery to renderers 712, and store information relating to the visual state of toggled items in a session memory 740.

On loading a report, a series of actions may be undertaken by report processing software 710 to provide a foundation for control of visual state parameters during the report display session. Exemplary actions are set forth in FIG. 10. While the flowchart suggests a sequence, the invention is not limited to this particular sequence. Report processing software 710 may first process a report according to initial visual state parameters 1000. This can involve determining the initial visual state declared for the various items according to FIG. 5, FIG. 6, and corresponding description. The report processing software 710 may, for example, read an initial visual state parameter for each item, or calculate an initial visual state parameter according to some predefined function. Report processing software 710 may also read or calculate and initial visual state for any control images in a report.

Report processing software 710 may then calculate toggle relationships in a report 1001. This may involve determining which report items are control items. Control items can be declaratively identified as set forth in FIG. 6 and corresponding description. When a control item is identified, report processing software may further identify which items are toggled from the control items. This process is depicted in FIG. 12. In FIG. 12 illustrates a view of a report from the view of report processing software 710. A list of items (1, 2, 3, 4, etc.) is provided along with corresponding data sufficient to describe the location and other features of each item. Items 2, 4, 13, and 31 have been identified as control items. The toggled items for each control item have also been identified. For example, the toggled items for control item 31 are items 16, 17, and 18. Calculating the toggled relationships in a report involves identifying which items are control items, and items are toggled by each control item.

Figure 10:
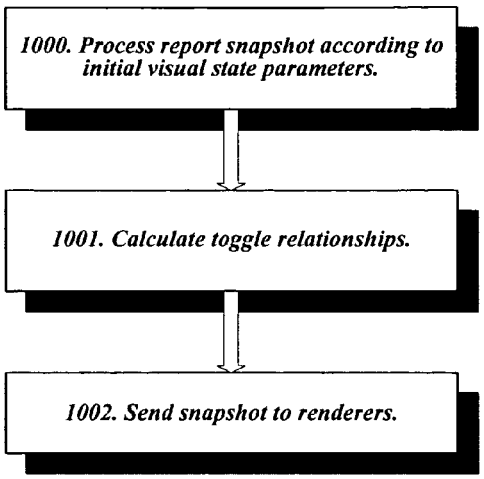
FIG. 10 provides a flowchart demonstrating processes for generating an initial view of a report and calculating toggle relationships for future use.

Finally with reference to FIG. 10 and FIG. 7, report processing software 710 can send a report snapshot to renderers 1002. The report snapshot can contain all the initially visible report items, and the control items can be properly equipped such that activation of a control item will deliver a message back to report processing software to toggle the visibility of the corresponding toggled items.

Figure 11:
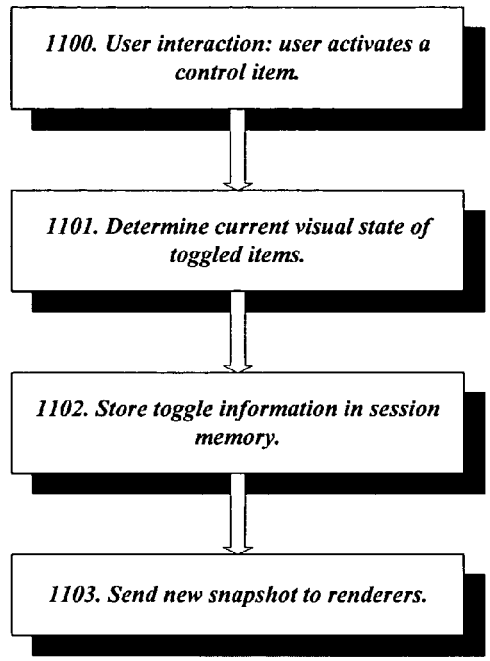
FIG. 11 provides a flowchart demonstrating processes for altering the view of a report pursuant to some user interaction with the control items provided in the report.

The process that may occur when a control item is activated is illustrated in FIG. 11. Referring to FIG. 11, the process begins by a user activating a control item 1100. Commonly, a control item is activated by clicking on the control item or clicking on the control image with a mouse pointer. Other activation techniques include mouseover, or simply hovering a mouse pointer over a control item, and selecting an item using arrows or a tab key on a keyboard and subsequently hitting an <enter> key. These and other activation techniques may be used in conjunction with the present invention.

Upon the occurrence of a user activation 1100, report processing software 710 may determine a current visual state of the toggled items 1101 referenced by the activated control item. On the first user interaction, the visual state of toggled items will be the initial visual state as described with reference to FIG. 6. Report processing software 710 may then toggle the visual state of the toggled items, store the toggled visual state in the session memory 1102, and deliver a new snapshot to report renderers 1103. For example, if half of the toggled items for an activated control item have an initial visual state of "on" and half have and initial visual state of "off", report processing software 710 can place all toggled items in the opposite visual state from that listed as the initial visual state. The toggled items can then be listed in session memory, as shown in FIG. 13, and a new snapshot is delivered to report renderers.

On a second user interaction with a control item, however, some toggled items may have been previously toggled. Instead of recalculating all toggle relationships and toggle history for the session, report processing software can simply examine the session memory, as shown in FIG. 13, and compare it to the initial visual state declared for an item to determine its current visual state. The most recent report snapshot may then be updated to reflect the change in visual state requested for a toggled item. An advantage of the system described is that complex toggle relationships can be supported without the need to recalculate all toggle relationships for every snapshot.

FIG. 8*a*, FIG. 8*b*, FIG. 8*c*, FIG. 8*d*, FIG. 9*a*, and FIG. 9*b* provide examples of various aspects and features of the invention. These illustrations can be compared to FIG. 1*a*, FIG. 1*b*, and FIG. 1*c* to demonstrate the power, flexibility, and numerous advantages in report design provided by the invention. Turning to FIG. 8*a*, an exemplary initial view of a report is provided. Two control items 800, 802 are displayed, each with a control image, e.g. 801. By presenting two control items 800, 802 at a peer level, this initial display can be immediately recognized as providing functions that are different from traditional show/hide properties in reports.

FIG. 8*b* shows a view of the report in FIG. 8*a* after activation of control item 800 (which is also control item 810 in FIG. 8*b*). The visual state of numerous toggled items 812, 813 has changed. First, two row headers 812 and two row footers (also 812) have appeared directly beneath the control item 810. In addition, the year column header 813 has appeared, along with the corresponding items in the year column. The use of a control item 810 to expand both the view of report items 812 directly beneath the control item 810 as well as report items 813 elsewhere in a report presents the advantage of controlling visibility of any items, as desired by a report designer. Views can be highly compact, or can display only targeted data, or can show the relationship between various data with a flexibility that was heretofore unattained.

FIG. 8c shows yet another view of the same report as that of FIG. 8a and FIG. 8b. In FIG. 8c, the control items 822 and 824 have been activated to display all corresponding toggled items 823, 825. This is a situation where the declarative visual state control techniques have been implemented to provide static drilldown into views of additional report items. Static drilldown is the traditional change of view for reporting, which is easily achieved by the systems and methods provided herein. In this scenario, an item at a container grouping level, e.g. 822, is used to control the visibility of the contents, e.g. 823. An alternate means for providing the same visual effect is that of recursive drilldown. Recursive drilldown occurs when an item in a recursive grouping, namely a grouping in which a hierarchy is defined in data rather than statically in the structure of a report, is used to control the visibility of child elements in the recursion. Both static and/or recursive drilldown techniques for controlling visual state may be used in conjunction with the declarative techniques for controlling visual state provided herein.

FIG. 8d demonstrates another exemplary view of the report provided in FIG. 8a, FIG. 8b, and FIG. 8c. Here, control item 831 has been activated to reveal toggled item 832, a column header for a "top product" column. The top product column also contains a control image 840. While FIG. 8d displays the flexibility of the invention in a relatively practical manner, namely, by controlling the visibility of a column adjacent to control item 831, it should be emphasized that this is merely one example of the flexible visual state control provided. The items toggled from any control item can be any items in a report. For example, if a report designer determined to control the visibility of item 833 from any or all of the control items, e.g. 831, 832 in FIG. 8d, this would be possible. Note that in various embodiments a plurality of control items can control overlapping sets of toggled items.

FIG. 9a and FIG. 9b show two views of a "top product" column such as the column of the same name provided in FIG. 8d. FIG. 9a and 9b illustrate that implementations of the invention need not simultaneously show or hide all of the toggled items for a particular control item 900, 950. For example, as provided in FIG. 9a, a first set of toggled items 910 can be displayed initially—either with an initial report display, or with an initial toggling on of a group of items such as the "top product" group of this example. This initial set of displayed items can correspond to a control image 920 visual state that is set according to a preference of the report designer. Upon activation of the control item 900 (referred to a 950 in FIG. 9b), the first set of toggled items 910 can disappear, while a second set 960 appears. Furthermore, a report is not limited to two sets of toggled items. A report designer may wish to provide multiple sets of toggled items that can be accessed serially by repeated activations of a control item.

Exemplary Computing Environment

The techniques of this invention are intended for use in connection with one or more computers. In particular, report design products implementing the methods disclosed herein are likely to provide a Graphical User Interface (GUI) to assist in the use of declarative elements to specify the qualities of a report as taught by this specification. Such a graphical user interface and the supporting computing hardware and software is well known in the art, and the following brief description is provided to more specifically point out the features of such a system, without endeavoring to describe in detail the operation of well known and understood computing technology.

With reference to FIG. 14, an exemplary system for implementing the invention includes a computing device, such as device 1400. In its most basic configuration, device 1400 typically includes a processing unit 1402 and memory 1404. Depending on the exact configuration and type of computing device, memory 1404 may be volatile (such as RAM), non-volatile (such as ROM, flash memory, etc.) or some combination of the two. Additionally, device 1400 may also have mass storage (removable 1408 and/or non-removable 1410) such as magnetic or optical disks or tape. Similarly, device 1400 may also have input devices 1414 such as a keyboard and mouse, and/or output devices 1416 such as a display that presents a GUI, as described above, as a graphical aid in facilitating report design. Other aspects of device 1400 may include network connections to other devices, computers, networks, servers, etc. using either wired or wireless media. All these devices are well know in the art and need not be discussed at length here.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A method for generating reports, comprising:
reading a file that declares a report design that specifies a plurality of items to include in a report and a plurality of locations for said plurality of items;
reading a first declaration associated with a first item, wherein said first declaration indicates an initial visual state for said first item;
reading a second declaration associated with a second item, wherein the second item can be at any location within the report including locations that are not adjacent to the first item, and wherein said second declaration indicates a relationship between said second item and said first item; and
generating data representing a report, wherein the report comprises said first item and said second item, and wherein a subsequent visual state of the first item can be controlled from the second item by activating at least a portion of said second item.

2. The method of claim 1, further comprising storing said initial visual state in memory.

3. The method of claim 1, further comprising storing said subsequent visual state in memory.

4. The method of claim 1, further comprising storing said relationship between said second item and said first item in memory.

5. The method of claim 1, further comprising reading an additional declaration associated with the second item, wherein said additional declaration indicates an initial visual state for an image within said second item.

6. The method of claim 5, wherein said at least a portion of the second item is a portion of the second item substantially overlapping the image within said second item.

7. The method of claim 5, wherein the report further comprises said image, and wherein a subsequent visual state for the image can be controlled from the second item by activating at least a portion of said second item.

8. The method of claim 1, wherein the file is an Extensible Markup Language (XML) file.

9. The method of claim 1, wherein activating at least a portion of said second item is by selecting the at least a portion of said second item with a selection device when the report is displayed on a Graphical User Interface (GUI).

10. The method of claim 1, wherein the report design further specifies a plurality of columns, and the plurality of locations are within said plurality of columns.

11. A computer readable medium bearing instructions for generating reports, comprising:
instructions for reading a file that declares a report design that specifies a plurality of items to include in a report, and a plurality of locations for said plurality of items;
instructions for reading a first declaration associated with a first item, wherein said first declaration indicates an initial visual state for said first item;
instructions for reading a second declaration associated with a second item, wherein the second item can be at any location within the report including locations that are not adjacent to the first item, and wherein said second declaration indicates a relationship between said second item and said first item; and
instructions for generating data representing a report, wherein the report comprises said first item and said second item, and wherein a subsequent visual state of the first item can be controlled from the second item by activating at least a portion of said second item.

12. The computer readable medium of claim 11, further comprising instructions for storing said initial visual state in memory.

13. The computer readable medium of claim 11, further comprising instructions for storing said subsequent visual state in memory.

14. The computer readable medium of claim 11, further comprising instructions for storing said relationship between said second item and said first item in memory.

15. The computer readable medium of claim 11, further comprising instructions for reading an additional declaration associated with the second item, wherein said additional declaration indicates an initial visual state for an image within said second item.

16. The computer readable medium of claim 15, wherein said at least a portion of the second item is a portion of the second item substantially overlapping the image within said second item.

17. The computer readable medium of claim 15, wherein the report further comprises said image, and wherein a subsequent visual state for the image can be controlled from the second item by activating at least a portion of said second item.

18. The computer readable medium of claim 11, wherein the file is an Extensible Markup Language (XML) file.

19. The computer readable medium of claim 11, wherein activating at least a portion of said second item is by selecting the at least a portion of said second item with a selection device when the report is displayed on a Graphical User Interface (GUI).

20. The computer readable medium of claim 11, wherein the report design further specifies a plurality of rows, and the plurality of locations are within said plurality of rows.

21. A system comprising:
a computing device comprising a Graphical User Interface (GUI), a processor, and memory;
a report for display on the GUI such that the report can be presented in a plurality of dynamically modifiable views, the report comprising:
a plurality of items located at a plurality of locations within at least one region of said report;
a first item at a first location within said at least one region, wherein said first item is initially displayed on GUI;
a second item at a second location within said at least one region, wherein a visual state of the second item is controlled by activating at least a portion of the first item; and
a third item at a third location within said at least one region, wherein said third item is initially displayed on GUI, and wherein said third item is located between said first item and said second item, such that the first item and the second item are not immediately adjacent.

22. The system of claim 21, wherein the report further comprises a fourth item that is also controlled by activating at least a portion of the first item, wherein the second item is initially displayed on the GUI while the fourth item is not initially displayed on the GUI.

23. The system of claim 21, wherein the first item comprises an image, and wherein a visual state of said image corresponds to the visual state of said second item.

24. The system of claim 21, wherein the first item is activatable by selecting said first item with a selection device.

25. The system of claim 24, wherein multiple activations of said first item operates to serially display multiple combinations of said plurality of items.

26. The system of claim 24, wherein said selection device is a mouse.

27. The system of claim 21, wherein the report further comprises a plurality of columns and rows, wherein the plurality of locations are within said columns and rows.

* * * * *